United States Patent
Michard

[19]

[11] Patent Number: 6,045,023
[45] Date of Patent: Apr. 4, 2000

[54] YARN MULTIPLE SUPPLY DEVICE FOR A MACHINE

[75] Inventor: Laurent Michard, Rai, France

[73] Assignee: Trefimetaux, Courbevoie, France

[21] Appl. No.: 09/029,241

[22] PCT Filed: Sep. 10, 1996

[86] PCT No.: PCT/FR96/01383

§ 371 Date: Mar. 3, 1998

§ 102(e) Date: Mar. 3, 1998

[87] PCT Pub. No.: WO97/10069

PCT Pub. Date: Mar. 20, 1997

[51] Int. Cl.$^7$ .......................... B65H 20/24; B65H 49/02; B23H 7/00

[52] U.S. Cl. ................ 226/110; 226/143; 219/69.12; 242/131; 242/564.4

[58] Field of Search ................ 226/110, 109, 226/11, 49, 50, 51, 143; 219/69.12, 68, 69.11; 242/131, 594.4, 594.5, 594.6, 564.4

[56] References Cited

U.S. PATENT DOCUMENTS

| | | | |
|---|---|---|---|
| 3,694,620 | 9/1972 | Gleason | 226/110 X |
| 4,645,894 | 2/1987 | Bonga | 219/69.12 |
| 4,655,379 | 4/1987 | Busch | 226/110 |
| 5,053,598 | 10/1991 | Sakai et al. | 219/69.12 |
| 5,237,145 | 8/1993 | Magara et al. | 219/69.12 |
| 5,275,034 | 1/1994 | Del Fabro et al. | 242/131 X |
| 5,340,958 | 8/1994 | Okazaki et al. | 219/69.12 |
| 5,450,777 | 9/1995 | Molnar et al. | 226/110 X |

FOREIGN PATENT DOCUMENTS 0 581 493   2/1994   European Pat. Off. .

OTHER PUBLICATIONS

Japanese Patent Abstract, Publication No. JP61121832, Sep. 1986.

*Primary Examiner*—Michael R. Mansen
*Attorney, Agent, or Firm*—Dennison, Scheiner, Schultz & Wakeman

[57] ABSTRACT

Apparatus for feeding a machine with a wire selected from a plurality of wires includes wire guides for supplying wires to a receiver device, a wire distributor for selecting one of the wires and moving the selected wire through an output guide to a machine, such as an electroerosion cutting device. The distributor includes shears for cutting the selected wire.

26 Claims, 5 Drawing Sheets

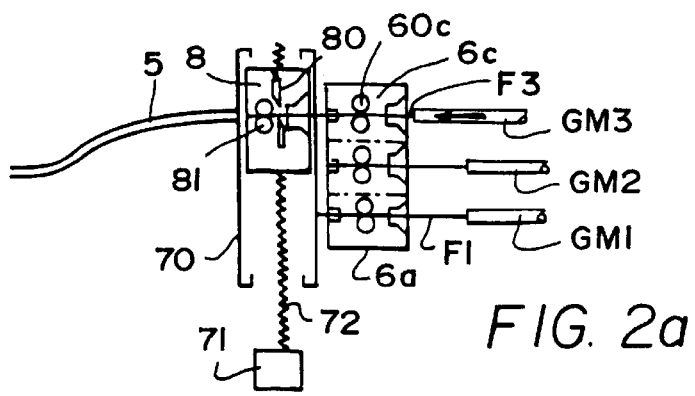
FIG. 2a
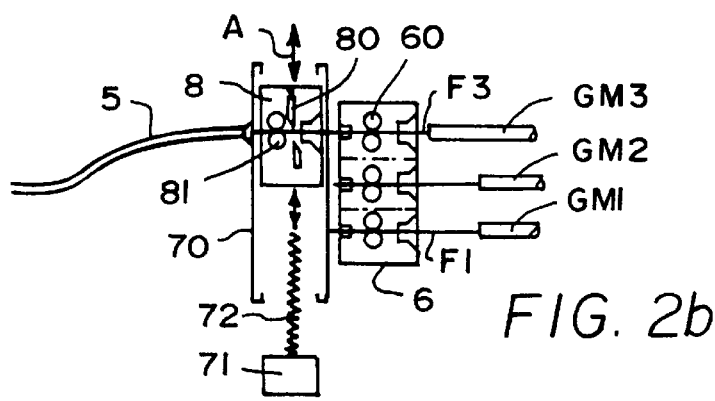
FIG. 2b
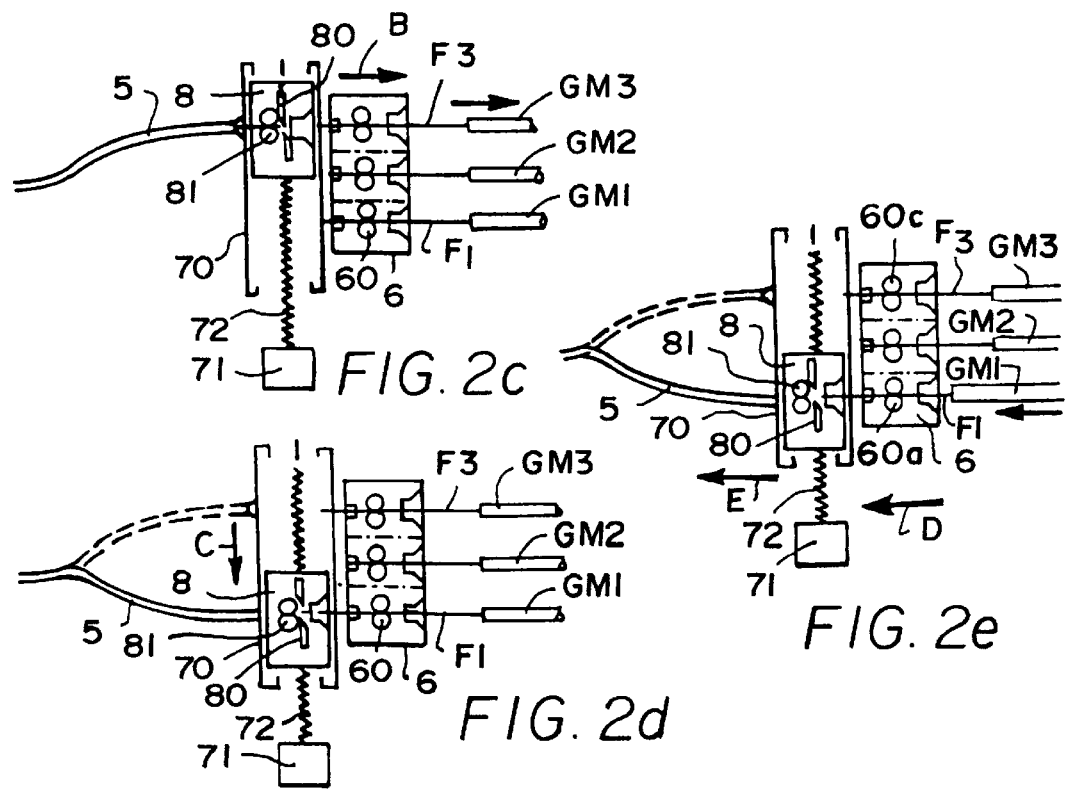
FIG. 2c
FIG. 2d
FIG. 2e

YARN MULTIPLE SUPPLY DEVICE FOR A MACHINE

FIELD OF THE INVENTION

This invention relates to the field of feeding machines with wire, outside the field of the textile and clothing industry.

STATE OF PRIOR ART

In mechanics, a number of machines use or consume wire, and consequently need a wire feed device and means for changing the wire., For example this is the case for wire electroerosion machines, in which it is necessary to do machining with different diameters of wires.

U.S. Pat. No. 5,237,145 thus describes a device for automatically changing the wire on an electroerosion machine, and for example changing from a given diameter wire to a smaller diameter wire to perform finer machining.

As is clearly shown in FIG. 1 in this US patent, this device is defined mainly by two characteristic elements:

a) this device comprises two feed devices (US references 150a and 150b) provided with motors (US references 24, 26) and a guide tube (US references 154a and 154b), devices corresponding to the two types of wires, and means for installing the active device and then removing it and replacing it by the other device, b) setting of the active device consists of using jacks (US references 151a, 151b) to align it with electroerosion machine wire guide elements (US references 153a and 153b), and to bring it close to these guide elements using a guide screw (US reference 18) aligned with these guide elements and a motor (US reference 20).

Similarly, European patent application No. EP-A-0 581 493 describes a device for changing the wire on an electroerosion machine, with a wire reel feed in which the ends of the wires are welded together.

There is also Japanese application JP-A-61 121832 in which the wire is changed using an electroerosion machine provided with a feed guide tube that can be directed towards either of the two reels of wire feeding the electroerosion machine.

PROBLEM THAT ARISES

The solution to the problem of changing ware provided by the feed devices described above in the state of prior art section has four different types of disadvantages:

1) on the one hand, these devices are only suitable for a single electroerosion machine and for a limited number of wires (two wires in each of the three documents mentioned). Note also that due to cost and size problems, the state of prior art solution only allows the presence of a limited number of feed wires (two in the three documents mentioned) or feed devices, which is a disadvantage to the extent that it would be desirable to have at least four feed devices particularly for machining with a wire electroerosion machine, two corresponding to the different wire diameters, and two on standby in case the wires should break.

2) Apart from the case of very small independent workshops, workshops have a number of different electroerosion machines. Most frequently, with devices made according to the state of prior art, the devices would have to be provided in large numbers, by duplicating the equipment for each individual machine, which increases costs, 3) on the other hand, devices according to the state of prior art generally impose alignment constraints with the electroerosion machine and therefore these devices are practically part of it, which correspondingly increases the total size occupied by the machine at the machining location, 4) finally, known devices are not well adapted to modern workshop configurations in which it is desirable that machines, particularly electroerosion machines are not encumbered with wire reels, these wire reels intended to feed said devices preferably being used to supply an entire group of machines and being stored separately.

OBJECT OF THE INVENTION

The object of the invention is a multiple feed device that solves the problems mentioned above.

This object is not limited to the particular type of electroerosion machine mentioned in the state of prior art.

SUMMARY OF THE INVENTION

The multiple feed device for feeding at least one machine with a selected wire according to the invention comprises:

a) the same number of feed devices $DA_i$ where i varies from 1 to n and n varies from 2 to any number, as there are wires $F_i$ to be selected, each device $DA_i$ being fed from wire packaging $C_i$ by means of input side guide means $GM_i$, b) at least one output side guide means GV designed to feed said machine with wire, c) a distributor, which puts said feed device $DA_i$ corresponding to said selected wire $F_i$, and in which, 1) a wire (9) feeding a feed devices $DA_i$ (6) is straightened, 2) said output side guide means $GV_j$ is a flexible tube (5).

3) said input side guide means $GM_i$ is a flexible tube (4).

This feed device includes a means of cutting the wire which can be built into the feed device, or into the distributor or into the receiving device.

The input side and output side guide means, typically tubes or sheaths, are preferable flexible, but they could be rigid provided that they enable movement of said device $DA_i$ and said receiver device DR so that they face each other.

In practice, the number n of wires rarely exceeds 16. But the invention is applicable to any number of wires.

The means defined by the invention solve all of the problems that occur.

In fact, on the one hand, for a given machine to be fed with an arbitrary number n of wires, the major part of the feed device is common and includes the distributor and the flexible receiver device DR provided with an output side guide means designed to feed said machine with wire.

Only the feed devices $DA_i$, where i varies from 1to n, have to be provided individually for each different wire.

On the other hand, the invention is not restricted to feeding a single machine, the same distributor and the same means upstream said distributor (feed devices, upstream guide means and the n straightened wires) may be used for all machines in the group.

Moreover, the invention allows for the use or flexible upstream and downstream guide means (typically tubes and sheaths) so that user machines do not need to be encumbered with auxiliary devices for their wire feed, since the device according to the invention may be relatively far away from said machines.

Thus, a complete fairly voluminous assembly, including the various wire packaging, can be relatively far away from said machine, i.e. a few meters to several tens of meters (stores).

Finally, all means according to the invention, and particularly the joint use of a distributor according to the invention, pre-straightened wires and flexible guide means, make it possible firstly to share means common to an entire group of machines, and secondly to relocate wire feed means which, as already mentioned, may be completely separated from the machines to be fed with wire, all of these elements being conducive to economic and rational management of workshops.

The distributor according to the invention is simply any mechanical means capable of putting the receiver device DR facing the chosen feed device $DA_i$ by the use of guide means (guide rails, worm screw, etc.) and movement means (jacks, motors, etc.) known per se. Thus, changing wire with the device according to the invention is extremely simple and fast since all that is necessary is to move a receiver device DR relative to a feed device $DA_i$ from one position to an adjacent position, without requiring joining wires.

BRIEF DESCRIPTION OF THE DRAWINGS

FIGS. 2a to 2e are cross sections showing the sequence of operation steps;

DETAILED DESCRIPTION OF THE INVENTION

Figure 1:
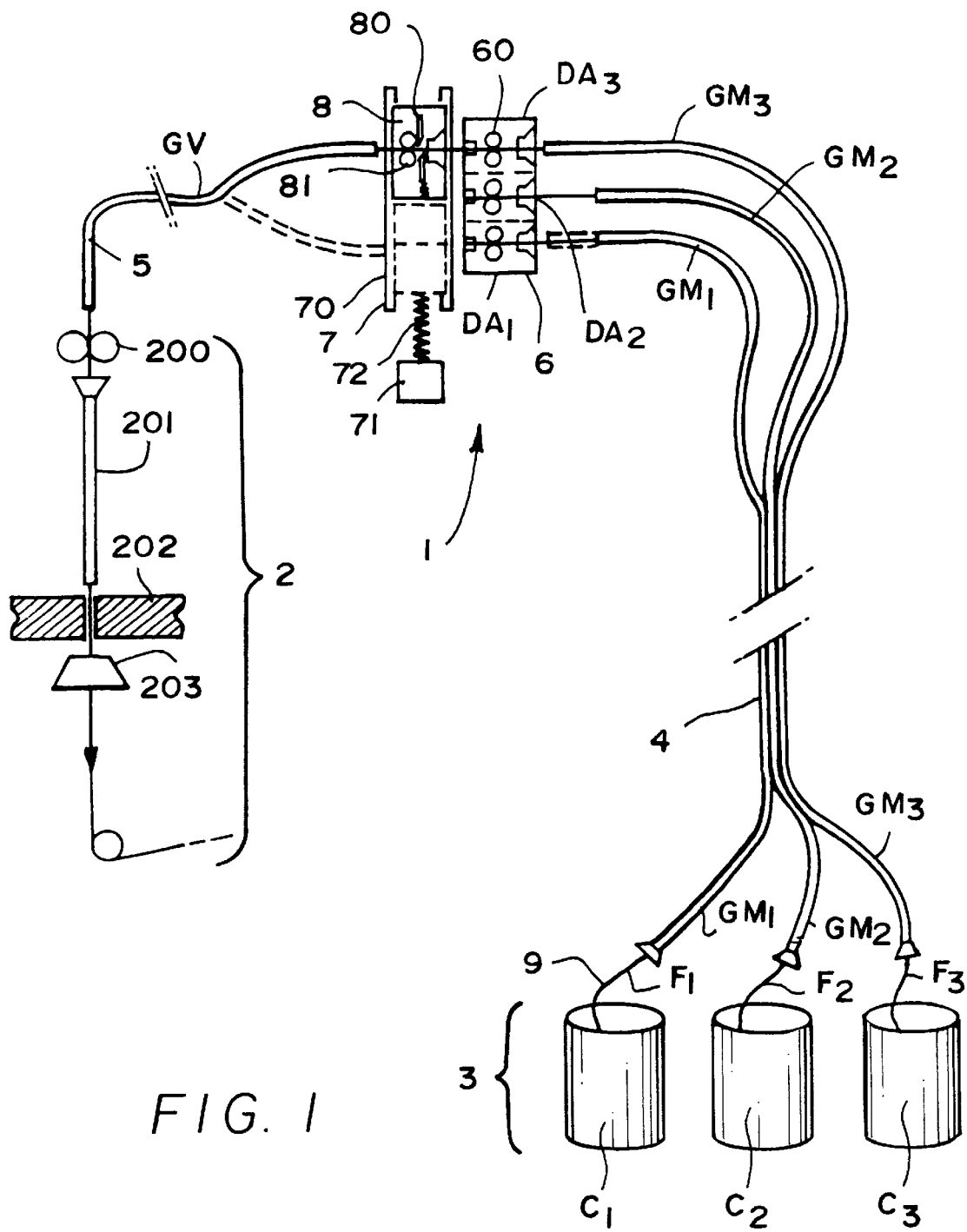
FIG. 1 is a schematic view of a first embodiment of the invention.

FIG. 1 shows an embodiment of the invention comprising, from upstream to downstream, firstly wire (9) packaging (3), then the multiple feed device (1) according to the invention and an electroerosion machine (2).

The packaging (3) comprises three drums denoted $C_1$, $C_2$ and $C_3$, the corresponding wires being denoted $F_1$, $F_2$ and $F_3$. Generally, objects with the same subscript correspond to each other.

The multiple feed device (1) comprises:

an upstream wire guide means (4) for each wire, the three guide means shown being denoted $GM_1$, $GM_2$ and $GM_3$.

a feed device (6) for each wire, the three feed means being denoted $DA_1$, $DA_2$, and $DA_3$. Each feed device (6) comprises a first set of wheels such as motor driven rollers (60) that engage the wire until it reaches the receiver device (8) or until the wire is removed after being cut.

a distributor (7) comprising a guide means (70) and a drive means driving the receiver device (8) comprising a motor (71) and a worm screw 72).

a receiver device (8) comprising shears (80) and a second set of motor driven rollers.

a downstream flexible wire guide means GV between the receiver device (8) and the electroerosion machine (2).

The electroerosion machine (2) comprises a set of drive wheels (200), an upper wire guide (201) and a lower wire guide (203), the part to be machined (202) being located between these two wire guides.

Generally, driven rollers (81) like driven rollers (60) only pull the wire forward during the initial wire engagement phase, and then as soon as the wire reaches the drive wheels (200) these drive wheels pull the wire, and the rollers (60, 81) then rotate in free wheel.

FIGS. 2a to 2e show operational steps of the device according to specifically the invention; the sequence of steps necessary to replace wire F3 with wire F1.

FIG. 2a shows the initial state; the device is in operation and is fed with wire F3, wire F3 moving from the right towards the left.

In FIG. 2b, the wire F3 is cut by the shears (80), as symbolized by arrow A.

In FIG. 2c, the drive rollers (60c) of the feed device (6c) remove wire F3 in the direction of arrow B, such that wire F3 is disengaged from the receiver device (8).

In FIG. 2d, the receiver device (8) is moved using guide rails (70), motor (71) and the drive worm screw (72), from position "3" to position "1".

In FIG. 2e, wire F1 is engaged in the receiver device (8) by rotating rollers (60a) and possibly rollers (81) until the drive wheel (200) in the electroerosion machine takes over.

Figure 3:
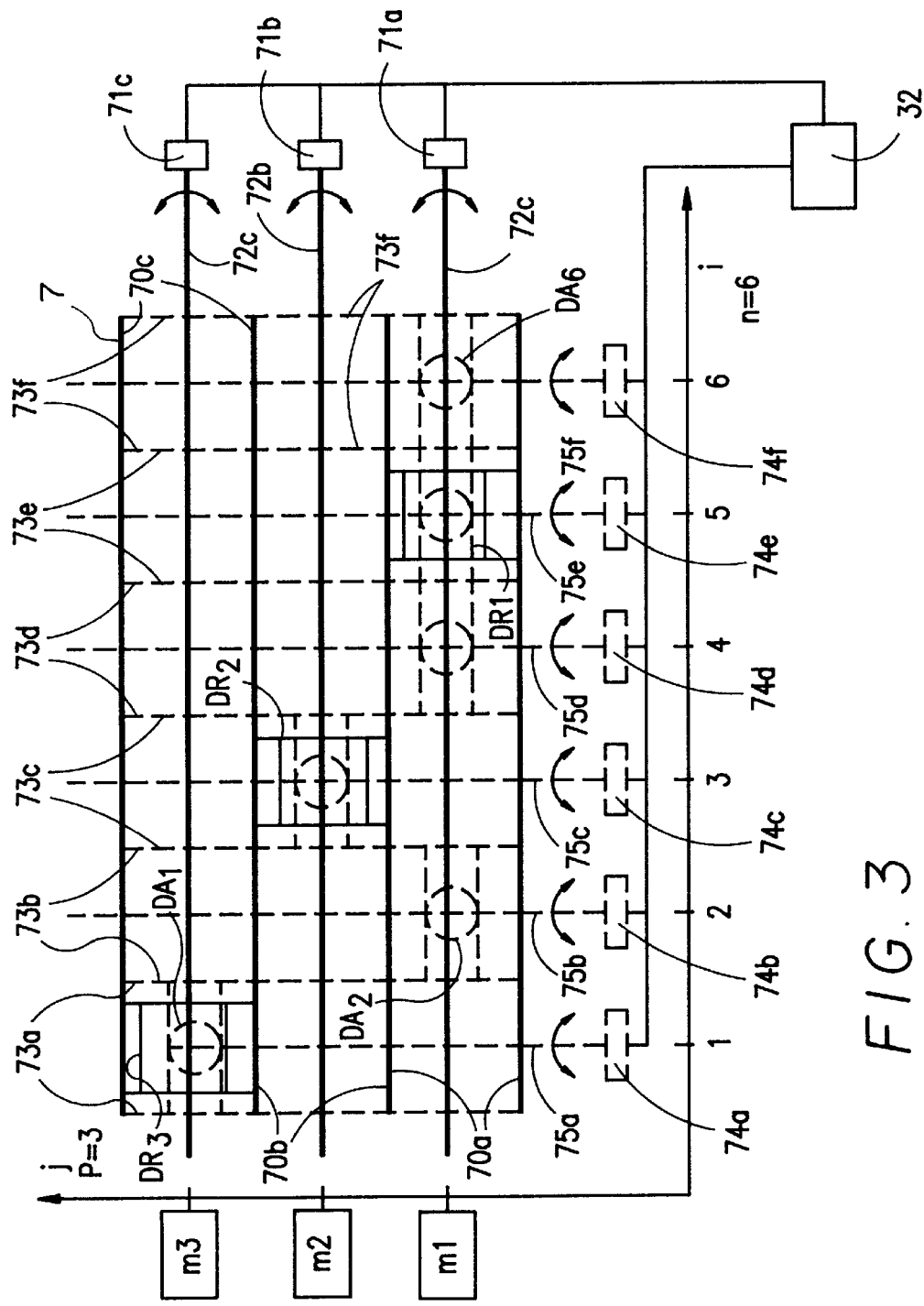
FIG. 3 is a schematic front view of a distributor.
Figure 4A:
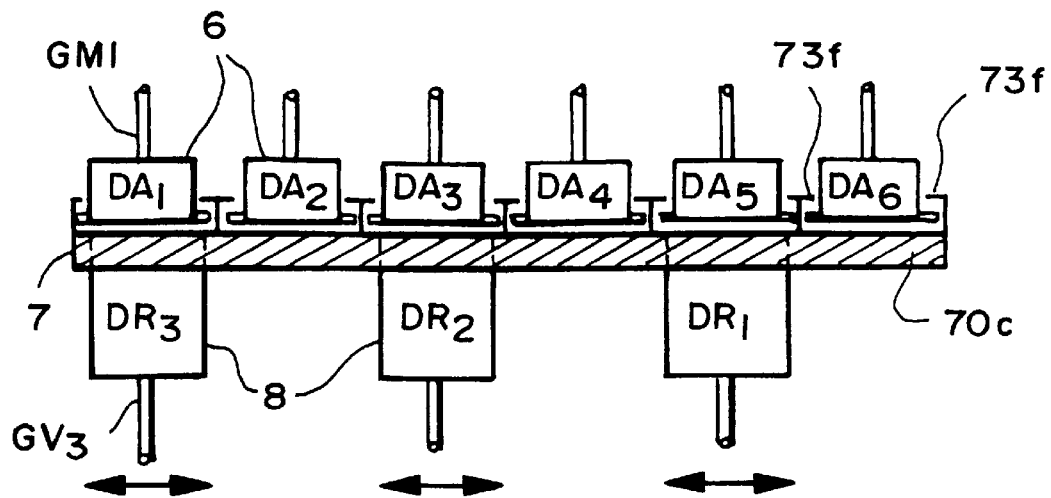
FIG. 4a is a top view of the distributor.
Figure 4B:
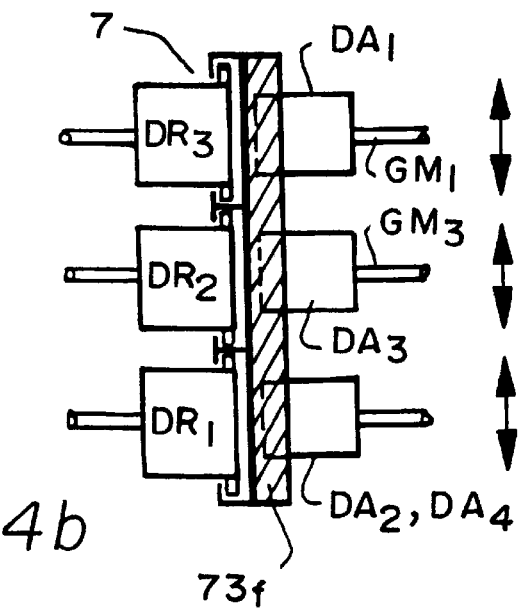
FIG. 4b is a right side view of the distributor.

FIGS. 3 4a and 4b show an embodiment of a distributor (7) in the case in which three machines are each to be fed with a wire chosen among six wires by means of six feed devices (6) and three receiver devices (8).

The parts shown in solid lines (front view) correspond to the three receiver devices (8), and the parts shown in dotted lines (back view) correspond to the six feed devices (6).

The distributor (7) includes guide and drive means corresponding to the six feed devices (6) and the three receiver devices (8) due to:

a lattice of guide means, formed by the intersection of three pairs of horizontal guide rails (70a to 70c) of the three receiver devices (8), with the six pairs of vertical guide rails (73a to 73f) of the six feed devices (6). Each feed device (6) on this open mesh lattice can only move along a given vertical column and is identified by $DA_i$, where i=1 to 6, whereas each receiver device (8) can only move along a given horizontal line, and is identified by $DR_j$, where j=1 to 3. These notations are shown between brackets in FIG. 3.

first means for moving the three receiver devices including motors (71a to 71c) and worm screws (72a to 72c) and second means for moving six feed devices including motors (74a to 74f) and worm screws (75a to 75f).

Figure 5:
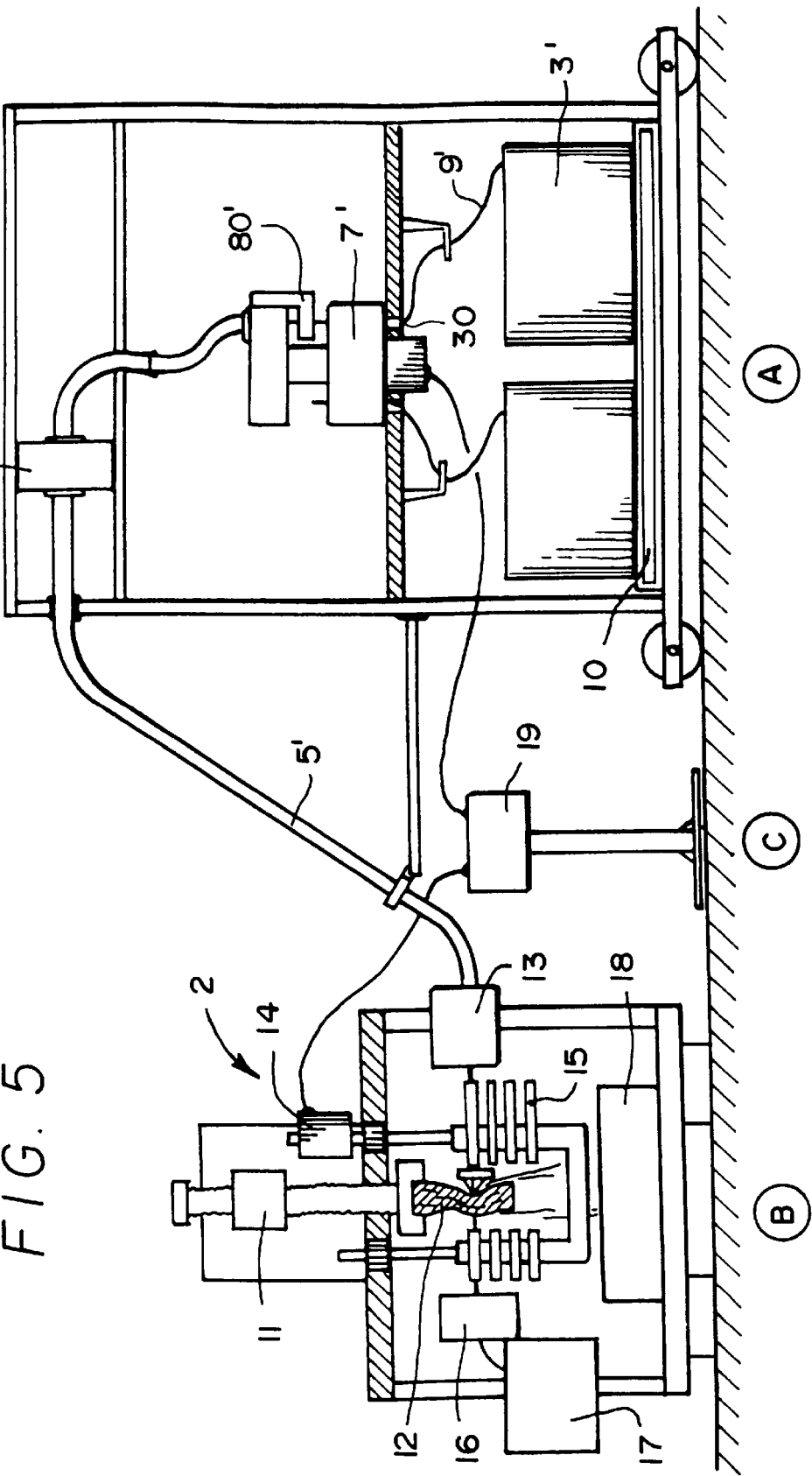
FIG. 5 is a schematic view of a machining assembly.

FIG. 5 shows a machining assembly (cutting by electroerosion) composed of three units denoted A, B and C.

Unit A represents a mobile carriage comprising:

drums (3) containing pre-straightened wire (9') off different diameters and grades mounted on pallet (10), a barrel wire selector (7'), the wire between the lower fixed multi-wire receptacle and the upper rotary selector being cut by means of shears (80), a roller drive (81) sending the wire into the sheath (5). Unit B represents a fixed electroerosion cutting machine (2) comprising:

the device (11) moving the part to be machined (12), the wire reception receptacle (13) into which the sheath is inserted (5), the vertical movement selector (14) supporting the wire guides (15), the wire tension drive/adjuster (16) and the container (17) for reception of consumed wire, the tank for the machining fluid (18).

Unit C shows the control desk (19) for coordination of the two selectors (7') and (14).

According to a first embodiment of the invention a multiple feed device (1) for a single electroerosion machine (2) includes feed devices $DA_i$ which are fixed so that a selected feed device and a receiver device DR are facing each other by means of a distributor (7) moving the receiver device to face a feed device corresponding to a selected wire $F_j$.

The selected device $DA_i$ may face said receiver device DR by moving a linear or circular distributor (7) with n positions corresponding to the outputs of the n devices $DA_i$, either by a selective linear or angular movement of the receiver device.

FIGS. 1 and 2a to 2e illustrate this embodiment in the special case of a linear distributor receiving three devices $DA_i$ corresponding to three wires $F_1$, $F_2$, $F_3$.

According to a second embodiment of the invention for a device designed to feed more than one machine Mj, this device (1) includes one receiver device $DR_i$ and one downstream guide device $GV_j$ (5) where j varies from 2 to p and p is any number but is typically less than 10, for each machine $M_j$ to be fed, in which said selected device $DA_i$ and said selected receiver device $DR_j$ face each other by means of a matrix distributor with n rows and p columns, each of said receiver devices $DR_j$ being moved linearly along row j to be positioned facing any selected column i, and said feed devices $DA_i$ are moved linearly along column i to face any selected row j.

This second embodiment is shown in FIGS. 3, 4a and 4b.

With this type of distributor, the feed device faces a receiver device by moving either one and/or the other device (6) or (8).

The invention may be applied to any type of wire provided that suitable drive means are adapted. However, wires that are easy to use according to the invention have sufficient compression strength so that they can be driven by simple mechanical means such as wheels or drive rollers, which is not generally the case for the relatively fine thread used in the textile industry.

Thread or wire that can be used may be composed of any material, natural materials, plastics, metals, and mixtures of materials or composite materials.

Preferably said thread or wire is metallic or includes a metal core.

The packaging of the wire may be a reel or a coil or any other conventional wire packaging means. Secondary means of unwinding the wire are inserted ahead of distributor (7). For packaging in reels, these means consist of motor driven unwinders, servocontrolled by wire tension control runners; these devices are generally expensive and cumbersome.

Furthermore the wire must be straightened before it enters the sheaths $GM_j$. This is necessary for satisfactory sliding of the wire in the tubes or sheaths and its precise positioning in the distributor. For small diameter wires packaged in reels, such as wires for electroerosion, means are known to guarantee sufficient straightness without it being necessary to straighten the wire. On the other hand, for larger diameter wires (for example used for screw cutting, cold heading or welding) and for wires packaged in drums, a straightening device 30 must be installed upstream each sheath. These devices are generally expensive, cumbersome and difficult to adjust.

In all cases, it is advantageous to use pre-straightened wire packaged in drums. In this case, the wire output from the drum is already straight and torsion free.

The feed device $DA_i$ according to the invention comprises an upstream drive means. The receiver device $DR_j$ may comprise shears (80) and downstream drive means (81).

These means are shown in FIGS. 1 and 2a to 2e.

The device according to the invention also comprises automation and coordination means 32 (computers or calculators, programmable logic controllers, etc.) making it possible to automatically change the wire $F_i$ and/or the machine $M_j$, particularly by automatic use of the distributor with its movement control means, upstream and downstream drive means, and shears (80), or any other means of changing the wire.

If the machine 2 is an electroerosion machine, the wire guide change (201, 203) and the corresponding automatic wire diameter change can be coupled together, since there is a wire guide with a given inside diameter corresponding to each wire diameter.

The invention can also be used to obtain an automated standby feed, by detection of the state of the upstream and downstream arrive means, typically motorized rollers for which rotation may be detected in the following different cases:

a) break in the wire feed:

Except during wire change operations, motor driven rollers (60, 81) of the feed devices $DA_i$ and the receiver devices $DA_j$ are inactive. They turn freely driven by wire friction; the wire is itself driven by a device (200) specific to the machine (2) located downstream. Roller motors are only used during wire changes as already described above.

However, these motor driven rollers may also be used to detect a feed defect upstream the device (wire break or end of reel). During normal unwinding of the wire, roller motors driven by the wire movement output an electric current by the dynamo effect. If there is a wire feed fault (in wire $F_i$), there is a short time period during which the rollers (60) of the device $DA_i$ stop while the rollers (81) of device $DR_j$ facing it continue to rotate. During this time period, the motor of the feed rollers (60) stops outputting current, whereas the motor of the receiver rollers continue to output current. This is a 100% reliable indicator that the feed wire is broken.

All that is necessary to provide an automatic standby feed when the feed wire $F_i$ breaks, is to:

firstly engage a wire $F_i'$ identical to $F_i$, in the feed device $DA_i'$, program the distributor (7) so as to move the receiver device $DR_j$ (facing $DA_i$) to position it facing $DA_i'$, as soon as the break in wire $F_i$ is detected, so that the feed can be resumed with wire $F_i'$.

b) blocking the wire:

If rollers (60, 81) for devices $DA_i$ and $DR_j$ stop simultaneously, a wire stoppage is detected instead of a break in the wire feed. This may be due either to blockage in unwinding the reel, or if the machine is stopped.

In the first case (poor unwinding of the reel), the automatic action can be programmed as follows; the shears (80) at wire $F_i$ are activated and the receiver device $DR_j$ is positioned facing the wire $F_i$ feed device $DA_i'$. If the downstream portion of the cut wire then advances correctly (as determined by a short term rotation of roller (81) of device $DR_j$), then the blockage really occurred upstream, therefore at the wire (3) reel or packaging. The machine can then restart normally using wire $F_i'$. If the downstream part of the cut wire does not advance and consequently the rollers (81) remain stationary, then the blockage occurs downstream, on the machine (2). In this case the system triggers an alarm so that the operator can take appropriate actions on the machine (2).

c) repeated failures of automatic reinsertion (particularly in the case of electroerosion machines):

In the case of electroerosion, some machine (2) stoppages are part of its normal operation, when the wire break occurs in its active area (in the actual machining area). Modern electroerosion machines use an automatic reinsertion device (with the same wire from the same reel) so that this type of almost inevitable incident can be dealt with. Reinsertion works well provided that the wire is sufficiently straight, which is generally the case. However, it is possible that reinsertion may be impossible if the wire is not sufficiently straight; in this case the machine stops.

This dysfunction can be overcome by programming the electroerosion machine computer so that, after a given number of reinsertion attempts (for example 3), it orders the distributor to cut the wire $F_i$ and engage wire $F_i'$. This prevents loss of production due to a prolonged stoppage of the machine.

d) reel change indicator (3):

The computer that controls the feed device (1) stores the number of wires $F_i$ that have been replaced. By periodically referring to the corresponding memory register, the workshop supervisor is kept informed and can organize replacement of empty or defective reels.

It is obvious that the invention is not limited to the means described in the examples or shown in the figures, and that the functions of the invention may be used with a number of practical alternatives that give the same results.

Another object of the invention is application of the device according to the invention to multiple and central feed of one or several machines $M_j$ (2) by several wires $F_i$ (9), said guide means (4, 5) and/or drive means (60, 81) being adapted to the mechanical properties of said wire, and particularly its compression strength.

Preferably, this application relates to wire electroerosion machines (2), and screw cutting (M1), cold heading (M2) and welding machines (M3).

EXAMPLE EMBODIMENTS

Example 1

The device shown in FIGS. 1, 2a to 2e, except for the means (71, 72) of controlling the movement of the receiver device (8), were made using a hydraulic jack with a programmable stroke.

The device has been automated so as to sequentially carry out all steps shown in detail in FIGS. 2a to 2e.

The packaging (3) included three drums of pre-straightened wire for the electroerosion machine.

The sheaths (4) were made of 12 m long flexible tubes.

The assembly composed of the feed devices (6), the distributor (7) and the receiver device (8) occupied a small volume of 10×20×50 cm³ and were placed on top of the electroerosion machine control desk.

It was found that wire changes were obtained in less than 2 seconds.

Example 2

The multiple feed device (1) was made as shown in FIGS. 3, 4a and 4b. As in the case in example 1, hydraulic jacks with programmable stroke and speed were used instead of the motors and worm screws of the FIG. 3 arrangement.

The distributor was formed by positioning three sets of horizontal guide rails (70a, 70b, 70c) and six sets of vertical rails (73a to 73f) on a metal frame 3.

A feed device denoted $DA_i$ (I=1 to 6) moved by a hydraulic jack, was placed on each of the vertical rails.

Similarly, a receiver device denoted $DR_j$ (j=1 to 3) moved by a hydraulic jack was placed on each of the horizontal rails.

Feed devices (6) and receivers (8) were similar to those used in example 1.

As in example 1, the device (1) control was automated and programmed. In particular, since resources (the six wires) are shared between three machines in this example, the program must predict and manage "conflicts" if two machines need to use the same wire.

Since movements of the vertical and horizontal jacks are independent, the wire change time in example 2 is practically the same as that in example 1.

Advantages of the Invention

The invention has all advantages provided by solving the problems that arise with the state of prior art.

Some of the most significant advantages are undoubtedly firstly the ability to keep all wire packagings separately in a storage location, in order to obtain a machining or transformation area without any large dead volumes.

Another major advantage lies in the joint use of input and output guide means, and preferably straightened wire, so that wire can be distributed in a manner similar to the distribution of fluids and power supplies (water, gas, electricity distribution, etc.), and almost as flexibly as the distribution of these fluids or power supplies.

Another advantage lies in automation of wire feed, which takes account of the many incidents that can occur, so that incidents related to the wire itself and its feed (apart from cases in which the machine itself is defective) do not have a significant influence on the productivity of the machine itself, since they are processed by the operator in idle time.

What is claimed is:

1. Multiple feed device (1) for at least one machine $M_j$ (2) to be fed with a straightened wire (9) selected from among n wires, with n varying from 2 to 16, comprising:
    a) a number n of feed devices $DA_i$, each device $DA_i$ being fed with a wire $F_i$ from wire packaging $C_i$ (3) by means of an input guide means $GM_i$, each feed device $DA_i$ comprising upstream drive means,
    b) one receiver device $DR_j$ (8) for each machine $M_j$ (2), provided with an output guide means $GV_j$, designed to feed said machine $M_j$ (2) with wire, each receiver device $DR_j$ comprising downstream drive means, and means to cut said wire,
    c) a distributor (7), for moving a selected receiver device between a first position in alignment with a first selected feed device $DA_i$ corresponding to the selected wire $F_i$, and a second position in alignment with a second one of the feed devices $DA_i$ whereby any one of said wires $F_i$ may be fed to any one of said at least one machine $M_j$.

2. The multiple feed device according to claim 1, in which said feed devices $DA_i$ are fixed, and said distributor (7) moves said selected receiver device $DR_j$ to face said selected feed device $DA_i$ corresponding to the selected wire $F_i$.

3. The multiple feed device according to claim 2, in which said distributor (7) moves said receiver device $DR_j$ along a path having n positions corresponding to the outputs of said number n of feed devices $DA_i$ (6), in order that said selected receiver device $DR_j$ faces said selected feed devices $DA_i$.

4. The multiple feed device according to claim 1 including a downstream guide means $GV_j$, comprising flexible tubes (5), for each of the at least one machine $M_j$ (2) to be fed, in which said distributor (7) is a matrix distributor (7A) having n linear feed device paths (73a to 73f) for each of the n feed devices $DA_i$ (6), and p linear receiver device paths (70a to 70c) for each of the p receiver devices $DR_j$ (8), whereby any machine may be fed with any wire, said matrix distributor (7) allowing any one of the feed devices DA to be aligned with any selected receiver device $DR_j$.

5. The multiple feed device according to claim 4, in which said straightened wire comprises a pre-straightened wire.

6. The multiple feed device according to claim 4, further comprising a wire straightening device upstream of said distributor.

7. The multiple feed device according to claim 1, in which said straightened wire (9) comprises a metallic wire.

8. The multiple feed device according to claim 1, further comprising automation and coordination means for automatic changing of the wire $F_i$ and/or the machine $M_j$ by automatic use of said distributor (7) with its movement.

9. A device according to claim 1, wherein at least one of said guide means and said drive means is specifically designed to accommodate said wires.

10. The apparatus of claim 9, wherein the at least one machine is selected from the group consisting of an electroerosion machine, a screw cutting machine, a cold heading machine and a welding machine.

11. Apparatus for feeding a machine with a single wire selected from a plurality of different wires, comprising:
   means for supplying wires;
   a receiver for the wires;
   a wire distributor;
   a wire output guide;
   said means for supplying wires feeding a plurality of wires to said receiver,
   said receiver including means for feeding the plurality of wires to the wire distributor and said wire distributor including means to move said wire output guide from a first position in alignment with any one wire of said plurality of wires to a second position in alignment with another one of said plurality of wires and for feeding a wire to the wire output guide.

12. The apparatus according to claim 11, wherein the receiver for the wires includes a plurality of feed devices and each feed device includes a pair of motor driven rollers.

13. The apparatus according to claim 12, wherein the wire distributor includes feed means which is movable relative to the receiver.

14. The apparatus according to claim 13, wherein the distributor further includes a pair of shears for cutting the selected wire.

15. The apparatus according to claim 12, further including a cutter for cutting a wire and control means for controlling said cutter and said wire distributor whereby a second one of said plurality of wires can be fed to said receiver after a first one of said plurality of wires is cut.

16. The apparatus according to claim 11, wherein the means for supplying wires includes a plurality of wire packagings, and a plurality of upstream wire guides.

17. The apparatus according to claim 16, wherein the plurality of wires are coiled wires that have been straightened.

18. The apparatus according to claim 16, wherein the wires are metallic.

19. The apparatus according to claim 16, wherein the wires comprise a metal core.

20. The apparatus according to claim 11, wherein the machine comprises a machine for performing a machining operation on the selected wire.

21. The apparatus according to claim 20, wherein the operation is electroerosion.

22. The apparatus according to claim 11, wherein said receiver for wires and said wire distributor are moved by means of a motor and worm gear device so that the distributor faces the feed device of the selected wire.

23. A method for feeding a wire to at least one machine, said method comprising:
   supplying each wire of said plurality of wires to one of a plurality of individual feeding devices in a distributor;
   moving one of said plurality of individual feeding devices in the distributor to a location opposite a selected receiver feeding device and feeding a wire from said individual feeding devices into said receiver feeding device; and
   outputting the wire from the selected receiver feeding device to a machine.

24. The method according to claim 23, further including the step of cutting the selected wire.

25. The method according to claim 23, wherein the machine is selected from a group of machines consisting of an electroerosion machine, a screw cutting machine, a cold heading machine and a welding machine.

26. Multiple feed device (1) for at least one machine $M_j$ (2) to be fed with a straightened wire (9) selected from among n wires, with n varying from 2 to 16, comprising:
   a) a number n of feed devices $DA_i$, each device $DA_i$ being fed with a wire $F_i$ from wire packaging $C_i$ (3) by means of an input guide means $GM_i$ comprising a flexible tube (4), each feed device $DA_i$ comprising upstream drive means comprising motorized rollers (60),
   b) one receiver device $DR_j$ (8) for each machine $M_j$ (2), provided with an output guide means $GV_j$ comprising a flexible tube (5), designed to feed said each machine $M_j$ (2) with wire, each receiver device $DR_j$ comprising downstream drive means, including motorized rollers (81), and means to cut a wire,
   c) a distributor (7), for aligning a selected feed device $DA_i$ corresponding to said selected wire $F_i$, with a selected receiver device $DR_j$ corresponding to a machine $M_j$, and,
   d) means for changing the position of at least one of the selected wire $F_i$ and the selected receiver device $DR_j$.

* * * * *